(12) United States Patent
Meckenstock et al.

(10) Patent No.: US 10,690,037 B2
(45) Date of Patent: Jun. 23, 2020

(54) PROTECTIVE DEVICE FOR PREVENTING EXHAUST GAS ESCAPE

(71) Applicant: Ford Global Technologies, LLC, Dearborn, MI (US)

(72) Inventors: Daniel Meckenstock, Wuppertal (DE); Marius Sawatzki, Pulheim (DE); Michael Spurling, Romford (GB)

(73) Assignee: Ford Global Technologies, LLC, Dearborn, MI (US)

( * ) Notice: Subject to any disclaimer, the term of this patent is extended or adjusted under 35 U.S.C. 154(b) by 91 days.

(21) Appl. No.: 15/725,187

(22) Filed: Oct. 4, 2017

(65) Prior Publication Data

US 2018/0094566 A1    Apr. 5, 2018

(30) Foreign Application Priority Data

Oct. 4, 2016 (DE) .................. 10 2016 219 148

(51) Int. Cl.
| | |
|---|---|
| *F01N 13/18* | (2010.01) |
| *F01N 13/14* | (2010.01) |
| *F01N 13/10* | (2010.01) |
| *F01N 13/08* | (2010.01) |
| *F16L 23/16* | (2006.01) |
| *F16L 27/02* | (2006.01) |
| *F02B 39/16* | (2006.01) |
| *F16B 2/08* | (2006.01) |
| *F02B 37/00* | (2006.01) |

(Continued)

(52) U.S. Cl.
CPC ......... *F01N 13/1827* (2013.01); *F01N 13/08* (2013.01); *F01N 13/10* (2013.01); *F01N 13/14* (2013.01); *F02B 39/16* (2013.01); *F16B 2/08* (2013.01); *F16L 23/16* (2013.01); *F16L 27/02* (2013.01); *F01D 25/243* (2013.01); *F01N 3/10* (2013.01); *F01N 2340/06* (2013.01); *F02B 37/00* (2013.01); *F05D 2220/40* (2013.01)

(58) Field of Classification Search
CPC . F16L 27/00–125; F16L 23/16; F16L 23/162; F16L 27/04–073; F16L 27/10–111; F16L 27/12; F02B 37/00–24; Y02T 10/14; Y02T 10/144
See application file for complete search history.

(56) References Cited

U.S. PATENT DOCUMENTS 2,117,152 A * 5/1938 Crosti .................. F16L 27/04
                                                       285/263
2,941,825 A * 6/1960 Heinrich .............. F16J 15/363
                                                       277/368

(Continued)

FOREIGN PATENT DOCUMENTS

DE    102008049096 A1    4/2010
DE    102013210982 A1    12/2014
(Continued)

*Primary Examiner* — Laert Dounis
(74) *Attorney, Agent, or Firm* — Geoffrey Brumbaugh; McCoy Russell LLP

(57) ABSTRACT

Methods and systems are provided for a coupling device and enclosure for an interface through which exhaust gas flow. The coupling device secures two sides of the interface to one another and the enclosure surrounds the interface and seals exhaust gases within the enclosure in an event that the interface becomes separated.

20 Claims, 3 Drawing Sheets

(51) Int. Cl.
*F01D 25/24* (2006.01)
*F01N 3/10* (2006.01)

(56) References Cited

U.S. PATENT DOCUMENTS

| | | | | |
|---|---|---|---|---|
| 3,043,636 | A * | 7/1962 | MacInnes | F01D 25/166 384/287 |
| 4,088,348 | A * | 5/1978 | Shemtov | F16L 27/04 285/184 |
| 4,350,372 | A * | 9/1982 | Logsdon | F16L 27/111 285/226 |
| 4,436,326 | A * | 3/1984 | Peaster | F16L 27/00 285/148.27 |
| 5,611,577 | A * | 3/1997 | Meyer | F16L 27/04 285/226 |
| 5,813,704 | A * | 9/1998 | Naito | F16L 27/11 285/226 |
| 6,354,632 | B1 * | 3/2002 | Jung | F01N 13/1811 285/226 |
| 6,464,258 | B2 * | 10/2002 | Shin | F01N 13/1816 285/226 |
| 6,902,203 | B2 * | 6/2005 | Kang | F01N 13/1811 285/226 |
| 6,910,506 | B2 | 6/2005 | Gabriel et al. | |
| 8,261,538 | B2 | 9/2012 | Kistner et al. | |
| 8,418,459 | B2 | 4/2013 | Finkbeiner et al. | |
| 8,500,172 | B2 * | 8/2013 | Turfait | F01N 13/1816 285/226 |
| 8,726,655 | B2 | 5/2014 | Smatloch et al. | |
| 2006/0123775 | A1 * | 6/2006 | Ellenberger | F01N 3/28 60/323 |
| 2009/0162140 | A1 * | 6/2009 | Patel | F16L 25/12 403/300 |
| 2010/0316494 | A1 | 12/2010 | Grusmann et al. | |
| 2014/0097613 | A1 * | 4/2014 | Ikeda | F16L 27/026 285/302 |

FOREIGN PATENT DOCUMENTS

FR 2839135 A1 10/2003
JP S6127915 U 2/1986

* cited by examiner

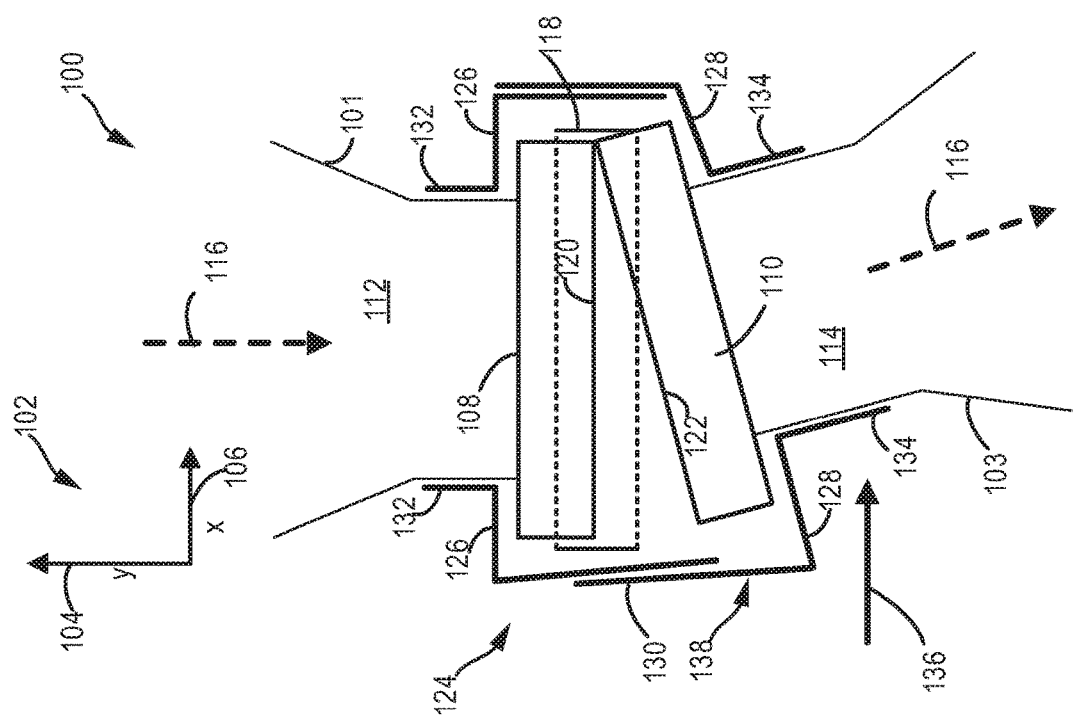
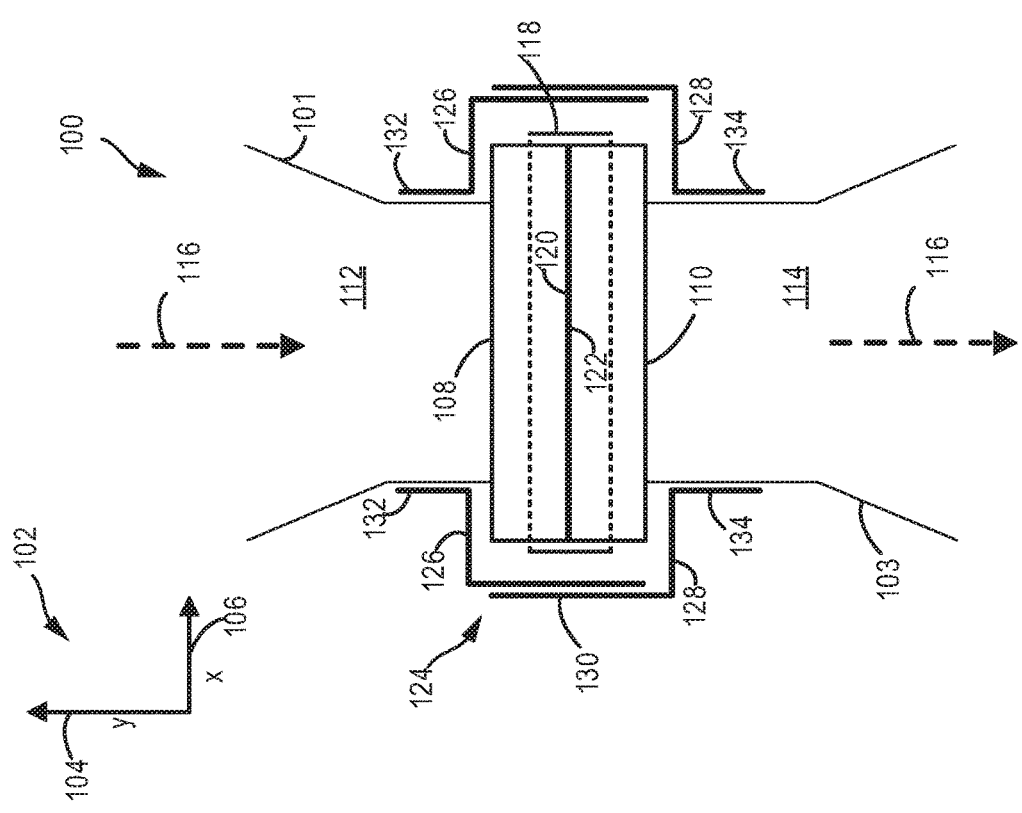

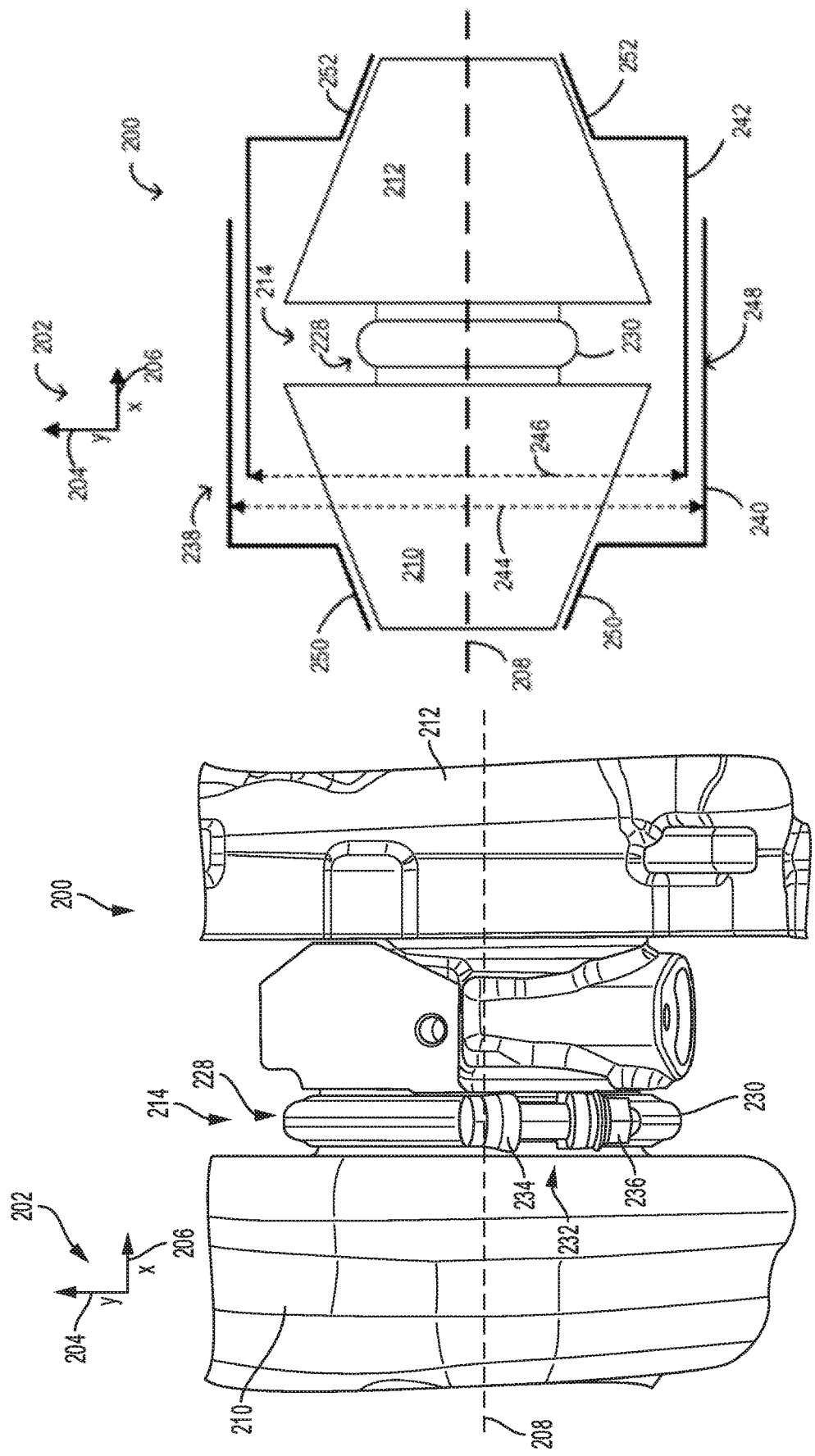

PROTECTIVE DEVICE FOR PREVENTING EXHAUST GAS ESCAPE

RELATED APPLICATIONS

This application claims priority to German Patent application No. 102016219148.9, filed Oct. 4, 2016, the entire contents of which is hereby incorporated by reference for all purposes.

FIELD

The present description relates generally to methods and systems for preventing the release of exhaust gases from the turbocharger upon vehicular collision.

BACKGROUND/SUMMARY

The turbine of an exhaust gas turbocharger provides the supercharging of the charge air generated by a compressor coupled to the turbine via a shaft. The system utilizes the energy of exhaust gases to boost the engine and the coupling of the turbine to at least one exhaust gas aftertreatment device, e.g., a catalytic converter, arranged downstream of the turbine, prevents the release of environmentally damaging substances to the atmosphere. Thus, the recycling of exhaust gases to drive the turbocharger and subsequent treatment of the exhaust gases by the catalytic converter provides an efficient and environmentally safe system to improve engine performance.

For proper operation of the turbocharger and exhaust gas aftertreatment device, the compressor, turbine, and exhaust gas aftertreatment device are connected so that gases are sealed within the devices. The turbine and compressor interface is often sealed by rigid connectors such as bolts. The turbine and exhaust gas aftertreatment device have flanges which are also arranged in a direct connection with one another but are sealed with a band bracket, e.g., a V-band clamp.

However, the inventors herein have recognized potential issues with such systems. As one example, during the event of displacement of engine components, the rigidity of the bolts securing the compressor and turbine interface may result in the bolts snapping, the interface becoming unsealed, and the gases circulating within the compressor and turbine escaping to the atmosphere. Similarly, the V-band clamp may degrade and allow an interface to become unsealed during such displacement, thereby allowing exhaust gases to escape.

In one example, the issues described above may be addressed by providing an interface between the compressor and turbine that is fastened with the V-band clamp instead of bolts. A protective device can be used in the region of the compressor-turbine interface and connecting V-band clamp. The protective device may completely enclose the interface and may include overlapping portions, allowing for longitudinal extension of the protective device. In this way, if the V-band clamp connecting the turbine to the compressor degrades and/or separates, the gases circulating through the turbocharger are still at least partially sealed within the protective device.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE DRAWINGS

FIG. 1A illustrates a first embodiment of a V-band clamp coupling a turbo housing flange to a flange of an exhaust gas aftertreatment device, surrounded by a protective device.

FIG. 1B illustrates the arrangement of the protective device upon separation of the flanges.

FIG. 2C shows a second embodiment of a V-band clamp connecting the compressor housing to the turbine housing at an interface.

FIG. 2D shows a second embodiment of a protective device enclosing the interface and V-band clamp.

FIGS. 2A-C are shown to scale although other relative spacing and positioning and sizing may be used if desired.

DETAILED DESCRIPTION

Figures 2A, 2B:
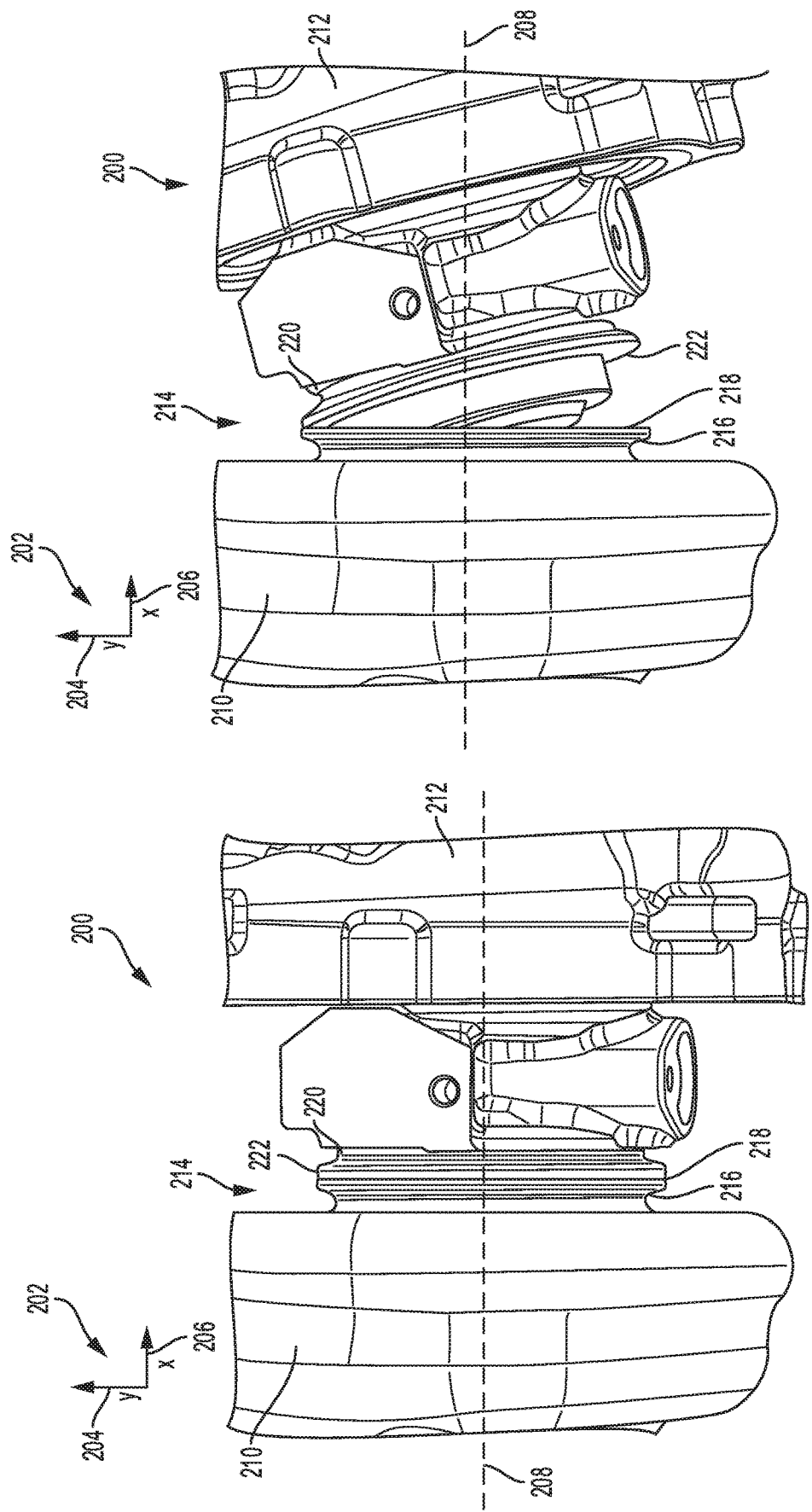
FIG. 2A shows an interface between a compressor housing and the turbine housing of a turbocharger.
FIG. 2B shows the separation of the turbine housing from the compressor housing at the interface.

The following description relates to systems and methods for a protective device that prevents the escape of exhaust gases to the engine and atmosphere. A first embodiment of the protective device surrounding a turbine housing flange coupled to an exhaust gas aftertreatment device flange where the flanges may be connected by a V-band clamp is shown in FIG. 1A. FIG. 1B depicts the separation of the exhaust gas aftertreatment device flange from the turbine housing flange upon experiencing a force perpendicular to the direction of flow and illustrates the telescopic function of the protective device to accommodate the separation. An interface between a compressor housing and a turbine housing of a turbocharger is shown in FIG. 2A and the separation of the interface is illustrated in FIG. 2B, showing how the turbocharger parts may be mated and where the seal between the two parts may be interrupted. In FIG. 2C, the interface between the compressor housing and turbine housing is depicted with a second embodiment of a V-band clamp sealing the interface. FIG. 2D is a schematic illustration showing the interface between the compressor housing and the turbine housing with a second embodiment of the protective device enclosing the interface and V-band clamp. The protective device is adapted to extend telescopically to accommodate for separation at the interface, thereby preventing the gases circulating within the turbocharger from escaping to the engine and atmosphere.

Turning now to FIGS. 1A-1B, an interface 100 may be a connection between a turbine housing flange 108 on a turbine side 112 of the interface, coupled to a turbine housing 101, and an exhaust aftertreatment device (e.g., a catalytic converter) flange 110 on a catalytic converter side 114 of the interface, coupled to a catalytic converter housing 103. A reference set of axes 102 is given illustrating the vertical direction 104 and the horizontal direction 106. The direction of gas flow through the interface 100 is indicated by a plurality of arrows 116. Henceforth a first element substantially in the direction of flow relative to a second element may be referred to as "downstream" of the second element and the second element may be referred to as being "upstream" of the first element.

A V-band clamp 118 may be arranged tangential, in the horizontal direction 106, to a first surface 120 of the turbine housing flange 108 that may be in face-sharing contact with a first surface 122 of the catalytic converter flange 110. The V-band clamp 118 may extend across both the turbine housing flange 108 and the catalytic converter flange 110 in the vertical direction 104 and may secure the flanges 108 and 110 in face-sharing contact, as shown in FIG. 1A. The interface between the turbine housing flange 108, catalytic converter flange 110, and connecting V-band clamp may be surrounded by a protective device 124 that extends upstream of the turbine housing flange 108 and downstream of the catalytic converter flange 110 in the vertical direction 104.

The protective device 124 may include a first part 126 and a second part 128. The first part 126 and the second part 128 of the protective device may have an overlapping region 130 where the diameter of the first part 126 is smaller than the diameter of the second part 128 of the protective device 124. The first and second parts 126 and 128 of the protective device 124 may be adapted to allow movement of the parts relative to one another, in the vertical direction 104, within the overlapping region 130. First and second parts 126 and 128 of the protective device 124 may also be described as being telescopically stacked. In one example first part 126 and second part 128 may be connected to one another telescopically, where the first part 126 may be moved into a cavity of the second part 128 with a locking device preventing the separation of the parts.

A first portion 132 of the first part 126 of protective device 124 upstream of the turbine housing flange 108 may be secured to the turbine housing 101 and a second portion 134 of the second part 128 of protective device 124 downstream of the catalytic converter flange 110 may be secured to the catalytic converter housing 103. The first portion 132 and second portion 134 may be attached to the turbine housing 101 and catalytic converter housing 103 by welding, as one example, or, as a second example, by clamps. In this way, the protective device 124 may surround the interface 100 between the turbine housing flange 108 and the catalytic converter flange 110 so that fluid may not penetrate protective device 124 and directly contact the interface 100.

Furthermore, the protective device 124 may be formed of a heat-resistant material. In one example, the protective device 124 may be formed from a metal. In a second example of the protective device 124, the protective device 124 may be formed from a woven fabric. As such, it may be appreciated that the function of the protective device described herein should not be limited by the type of material from which it is formed.

FIG. 1B depicts an arrangement of the interface 100 where a force 136 may be applied in the horizontal direction 106 to the catalytic converter side 114 of the interface 100. The force 136 may result in the first surface 122 of the catalytic converter flange 110 moving away from the first surface 120 of the turbine housing flange 108. The catalytic converter flange 110 may be tilted relative to the turbine housing flange 108 and the interface 100 may no longer be coupled in face-sharing contact by the V-band clamp 118. The protective device 124 may adapt to the separation of the interface 100 and tilted positioning of the catalytic converter flange 110 by expanding in the vertical direction 104 along a side 138 adjacent to the side of the interface 100 where the catalytic converter flange 110 is spaced away from the turbine housing flange 108. The length, in the vertical direction 104, of the overlapping portion 130 of side 138 of protective device 124 may shrink relative to the length of the overlapping portion 130 when the turbine housing flange 108 and the catalytic converter flange are in face-sharing contact, as shown in FIG. 1A. As such, the sealing ability of the protective device 124 about the interface 100 may be maintained even when the connection generated by the V-band clamp is broken. The gas flowing through the interface 100 may thereby be contained within the protection device 124 and the escape of the gas to the engine and atmosphere may be avoided.

FIGS. 2A-2D illustrate a turbocharger 200 that may include a turbine housing 210, a compressor housing 212, and an interface 214 disposed between the turbine housing 210 and the compressor housing 212. A central axis 208 runs through both the turbine housing 210 and the compressor housing 212, extending in a direction perpendicular to the interface 214. A reference set of axes 202 is given illustrating the vertical direction 204 and the horizontal direction 206.

As seen in FIGS. 2A-2B, the turbine housing 210 may include a turbine flange 216 with a lip extending away from the central axis 208 adapted with a first internal wall 218. The compressor housing 212 may include a compressor flange 220 that also has a lip extending away from the central axis 208. The compressor housing 212 has a second internal wall 222 that is adapted to mate with the first internal wall 218 in face-sharing contact.

FIG. 2A shows the interface 214 with the compressor flange 220 parallel with the turbine flange 216 and the first internal wall 218 of the turbine flange 216 in face-sharing contact with the second internal wall 222 of the compressor flange 220. FIG. 2B shows an example of the turbocharger 200 where the compressor housing 212 may be separated from the turbine housing 210 at the interface 214. The compressor housing 212 may be tilted relative to the central axis 208 so that the bottom of the compressor flange 220 is spaced away from the bottom of the turbine flange 216. In one example, this arrangement may be a result of a collision where the impact causes the compressor to shift out of alignment with the central axis 208. In other examples, the compressor may shift so that the top of the compressor flange 220 is spaced away from the top of the turbine flange 216 or the side of the compressor flange 220 is spaced away from the adjacent side of the turbine flange 216. In yet another example, the compressor housing may remain aligned with the central axis 208 but the turbine housing 210 is tilted relative to the central axis 208.

The interface 214 between turbine housing 210 and compressor housing 212 is shown in FIG. 2C surrounded by a V-band clamp 228. The V-band clamp 228 may be used similarly to the V-band clamp 118 in FIG. 1A to provide a sealing connection between the turbine flange, e.g., the turbine flange 216 in FIGS. 2A-2B, and the compressor flange, e.g., the compressor flange 220 in FIGS. 2A-2B. An outer edge surface 230 as well as an inner edge surface (not shown) of the V-band clamp is curved to accommodate and curve around the lips of the compressor flange and turbine flange, such as the lips of turbine flange 216 and compressor flange 220 in FIGS. 2A-2B. V-band clamp 228 also has a hinge 232 that may be pivoted open at a first end 234 so that a second end 236 rotates outwards from the V-band clamp to loosen and remove the V-band clamp. The second end 236 of the hinge 232 may include a screw or bolt that, upon rotating the screw or bolt, tightens the V-band clamp 228 around the interface 214. In this way, the V-band clamp 228 may maintain the mating of the compressor flange to the turbine flange and seal the gases flowing through the compressor and turbine within the turbine housing 210 and compressor housing 212.

The interface 214, including the V-band clamp 228, between the turbine housing 210 and compressor housing 212 is shown in FIG. 2D with a protective device 238, which may be used similarly to the protective device 124 in FIGS. 1A-1B, enclosing the interface 214. Protective device 238 may have a first part 240 and a second part 242 where the first part 240 may have a wider diameter, indicated by an arrow 244, than the diameter, shown by an arrow 246, of the second part 242. The protective device 238 may also include an overlapping region 248 where a portion of the second part 242 of protective device 238 may be contained inside of a cavity of the first part 240 and may be described as telescopically stacked. The first and second parts 240 and 242 may be adapted to allow movement of the parts relative to one another in the horizontal direction 206 in the overlapping region 248.

As described above for the protective device 124 in FIGS. 1A-1B, the protective device 238 may be formed of a heat-resistant material. In one example, the protective device 238 may be formed from a metal. In a second example of the protective device 238, the protective device 238 may be formed from a woven fabric. As such, it may be appreciated that the scope of the disclosure described herein should not be limited by the type of material from which it is formed.

A first portion 250 of the first part 240 of protective device 238, as shown in FIG. 2D, may be secured to the turbine housing 210 and an outer surface of an exhaust gas inlet duct (not shown) to allow exhaust gas flow into the turbine housing 210, and a second portion 252 of the second part 242 of protective device 238 may be secured to the compressor housing 212. The first portion 250 and second portion 252 of the first and second parts 240 and 242 of protective device 238 may be attached to the turbine housing 210 and compressor housing 212 by welding, as one example, or by clamps, as a second example.

In this way, the protective device 238 may surround the interface 214 between the turbine housing 210 and the compressor housing 212, which may be held together by the V-band clamp 228, so that fluid may not penetrate protective device 238 and directly contact the interface 214. The turbine housing 210 and compressor housing 212 may become separated at the interface 214, as shown in FIG. 2B, as a result of a collision in one example, where turbocharger 200 may experience an impact that shifts either the turbine housing 210 or the compressor housing 212 so that it may not be aligned with the central axis 208. Gases that circulate within the turbine housing 210 and compressor housing 212 may escape through the turbine flange, e.g., turbine flange 216 in FIGS. 2A-2B, and compressor flange, e.g., compressor flange 220 in FIGS. 2A-2B, but remain contained within protective device 238. Thus the escape of exhaust gases to the engine and atmosphere may be avoided.

FIGS. 1A-2D show example configurations with relative positioning of the various components. If shown directly contacting each other, or directly coupled, then such elements may be referred to as directly contacting or directly coupled, respectively, at least in one example. Similarly, elements shown contiguous or adjacent to one another may be contiguous or adjacent to each other, respectively, at least in one example. As an example, components laying in face-sharing contact with each other may be referred to as in face-sharing contact. As another example, elements positioned apart from each other with only a space therebetween and no other components may be referred to as such, in at least one example. As yet another example, elements shown above/below one another, at opposite sides to one another, or to the left/right of one another may be referred to as such, relative to one another. Further, as shown in the figures, a topmost element or point of element may be referred to as a "top" of the component and a bottommost element or point of the element may be referred to as a "bottom" of the component, in at least one example. As used herein, top/bottom, upper/lower, above/below, may be relative to a vertical axis of the figures and used to describe positioning of elements of the figures relative to one another. As such, elements shown above other elements are positioned vertically above the other elements, in one example. As yet another example, shapes of the elements depicted within the figures may be referred to as having those shapes (e.g., such as being circular, straight, planar, curved, rounded, chamfered, angled, or the like). Further, elements shown intersecting one another may be referred to as intersecting elements or intersecting one another, in at least one example. Further still, an element shown within another element or shown outside of another element may be referred as such, in one example.

The conventional use of a band bracket, such as a V-band clamp, to couple a turbine housing flange to a catalytic converter flange may be supplemented by a surrounding protective device that has a sealing capacity around the turbine housing/catalytic converter interface. The protective device may be adapted for telescoping movement, thereby able to remain maintain a seal around the interface in the event that the turbine housing and catalytic converter become separated at the interface and exhaust gas flows out of the turbine housing flange. The combination of the V-band clamp fastener and enclosing protective device may also be applied to the coupling of the compressor housing to the turbine housing, thereby containing gases that circulate within the compressor and turbine within the protective device if the compressor housing and turbine housing become separated. The technical effect of using the V-band clamp and protective device is to secure two flanges together that provide a path for exhaust gas flow via the V-band clamp and to prevent exhaust gases from being emitted to the engine and atmosphere, if the flanges become separated, by enclosing the interface with a telescoping protective device.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. An arrangement of an internal combustion engine with an exhaust gas section, in which at least one turbine with a first flange and an exhaust gas aftertreatment device with a second flange are arranged, which turbine and exhaust gas aftertreatment device are connected to one another rigidly at their flanges by at least one band bracket, a first surface of the first flange in face sharing contact with a second surface of the second flange, the first and second surfaces perpendicular to an exhaust flow direction, wherein a protective device is arranged in a region of the turbine, the band bracket and the exhaust gas aftertreatment device, the protective device having a first sealing region upstream of the band bracket, a second sealing region downstream of the band bracket, and a third sealing region circumferentially surrounding the band bracket, wherein the third sealing region includes only a first part and a second part which overlap one another with only a single circumferential overlap, with no other components between the first part and the second part throughout a total length of the overlap, and a sealing contact between the first part and the second part is maintained during movement of the protective device, where a length of the single overlap is such that sealing ability of the protective device is maintained even when the connection generated by the band bracket is broken due to tilting of the first flange relative to the second flange.

2. The arrangement as claimed in claim 1, in which the protective device includes the first part and the second part which overlap one another, the first part having a greater diameter in an overlapping region than the second part.

3. The arrangement as claimed in claim 2, in which the first part and the second part of the protective device are of telescopic configuration.

4. The arrangement as claimed in claim 2, in which the first part of the protective device is welded to the exhaust gas section upstream of the first flange, and the second part is welded to the exhaust gas section downstream of the second flange.

5. The arrangement as claimed in claim 2, in which the first part of the protective device is clamped to the exhaust gas section upstream of the turbine, and the second part is clamped to the exhaust gas section downstream of the exhaust gas aftertreatment device.

6. The arrangement as claimed in claim 1, in which a material of the protective device includes a temperature-resistant material.

7. The arrangement as claimed in claim 6, in which the temperature-resistant material of the protective device is a metal.

8. The arrangement as claimed in claim 6, in which the temperature-resistant material of the protective device is a woven fabric.

9. The arrangement as claimed in claim 2, in which the first and second parts of the protective device are connected to one another in the overlapping region in such a way that no fluid can penetrate the connection.

10. A system, comprising:
a turbocharger having a turbine-side housing rigidly coupled with a compressor-side housing via a V-band clamp at an interface therebetween, the interface including first and second flanges having surfaces in face-sharing contact, the surfaces perpendicular to a central axis of the turbocharger; and
an enclosure enclosing the interface, the enclosure having two sections configured to provide a first seal at the turbine-side housing, a second seal at the compressor-side housing, and a third seal between the two sections, along a circumference of the enclosure and around the interface, wherein the third seal includes only a first part and a second part which overlap one another with only a single circumferential overlap, with no other components between the first part and the second part throughout a total length of the overlap, where the length of the single overlap is such that sealing ability of the enclosure is maintained even when a connection generated by the V-band clamp is broken due to tilting of the first flange relative to the second flange.

11. The system of claim 10, wherein the turbine-side housing and the compressor-side housing are coupled at the interface only via the V-band clamp and the enclosure, and not via bolts at the interface, and wherein the enclosure fully surrounds and fully encloses an entire circular exterior of the interface.

12. The system of claim 11, wherein the turbine-side housing and the compressor-side housing mate at the interface via first and second internal walls.

13. The system of claim 12, wherein the first and second internal walls are disposed within first and second flanges.

14. The system of claim 13, wherein the first and second flanges have outer lips that extend outwards from the central axis of the turbocharger, and wherein the overlap extends along the central axis from the compressor-side housing to the turbine-side housing.

15. The system of claim 10, wherein the first part has a larger diameter than the second part.

16. The system of claim 15, wherein portions of the first and second parts of the enclosure overlap and wherein the second part of the enclosure is adapted to be contained within a cavity of the first part of the enclosure.

17. The system of claim 15, wherein the enclosure is adapted to have telescopic movement, and wherein the second part of the enclosure slides in and out of the first part of the enclosure.

18. The system of claim 10, wherein the enclosure is secured to the turbine-side housing and the compressor-side housing of the turbocharger via clamps or welding.

19. The system of claim 10, wherein the enclosure is formed of a heat-resistant material or wherein the enclosure is flexible.

20. A system, comprising:
a turbocharger having a turbine-side housing rigidly coupled with a compressor-side housing via a V-band clamp at an interface therebetween, the interface forming a seal for exhaust gasses expanded by a turbine in the turbine-side housing, the interface including first and second flanges having surfaces in face-sharing contact, the surfaces perpendicular to a central axis of the turbocharger; and
an enclosure with two portions, completely enclosing an entirety of the interface and having a first turbine-side seal, a second compressor-side seal, and a third seal between the two portions, the third seal surrounding the interface, wherein the third seal includes only a first part and a second part which overlap one another in a direction of the central axis of the turbocharger, there being only a single circumferential overlap between the first and second parts, with no other components directly interposed between an inner wall of the first part and an outer wall of the second part both within the third seal and throughout a total length of the overlap of the third seal, the second part having a smaller outer radius than the first part, where the length of the single overlap is such that sealing ability of the enclosure is maintained even when a connection generated by the V-band clamp is broken due to tilting of the first flange relative to the second flange.

* * * * *